United States Patent
Kuczynski et al.

(10) Patent No.: US 9,985,557 B2
(45) Date of Patent: May 29, 2018

(54) CONTROL SYSTEM AND METHOD FOR POWER PLANT

(75) Inventors: Konrad Jerzy Kuczynski, Strathclyde (GB); David James Adams, Sussex (GB)

(73) Assignee: DOOSAN BABCOCK LIMITED, Sussex (GB)

(*) Notice: Subject to any disclaimer, the term of this patent is extended or adjusted under 35 U.S.C. 154(b) by 633 days.

(21) Appl. No.: 13/882,454

(22) PCT Filed: Oct. 28, 2011

(86) PCT No.: PCT/GB2011/052102
§ 371 (c)(1),
(2), (4) Date: Sep. 23, 2013

(87) PCT Pub. No.: WO2012/056245
PCT Pub. Date: May 3, 2012

(65) Prior Publication Data
US 2014/0001757 A1    Jan. 2, 2014

(30) Foreign Application Priority Data

Oct. 28, 2010  (GB) .................................. 1018227.7

(51) Int. Cl.
*H02N 99/00*       (2006.01)
*F25J 3/04*        (2006.01)
(Continued)

(52) U.S. Cl.
CPC ............. *H02N 99/00* (2013.01); *F01K 13/02* (2013.01); *F01K 23/068* (2013.01);
(Continued)

(58) Field of Classification Search
CPC ..... H02N 99/00; F01K 23/068; F01K 23/101; F01K 13/02; F23N 3/002; F23L 7/007;
(Continued)

(56) References Cited

U.S. PATENT DOCUMENTS

| 6,134,916 A | 10/2000 | Jahnke |
| 6,196,000 B1* | 3/2001 | Fassbender ............... F02C 3/28 |
| | | 60/649 |

(Continued)

FOREIGN PATENT DOCUMENTS

| EP | 1 160 528 A2 | 12/2001 |
| EP | 2 078 828 A1 | 7/2009 |

(Continued)

OTHER PUBLICATIONS

UK Search Reported dated Feb. 25, 2014 issued in UK Application No. GB1018227.7.

(Continued)

*Primary Examiner* — Christopher E Everett
(74) *Attorney, Agent, or Firm* — Sughrue Mion, PLLC (57) ABSTRACT

A method of operation of a thermal power plant having an air separation system with a plurality of air storage unit (ASU) compressors and a liquid oxygen/liquid air (LOX/LA) storage facility for oxyfuel firing of fossil fuel and a power plant having a control system to perform the same are described. The method is characterized by the step of controlling the net power output of the plant in response to short term variations in grid demanded net plant output by dynamically adjusting the works power of the ASU compressors preferably in conjunction with co-ordinated changes in firing demand. The method is in particular a method to produce an improved primary and secondary response to transient changes in grid demand and to provide accurate response to load dispatch ramps.

20 Claims, 2 Drawing Sheets

(51) Int. Cl.
*F01K 13/02* (2006.01)
*F23L 7/00* (2006.01)
*F23N 3/00* (2006.01)
*F01K 23/06* (2006.01)
*F01K 23/10* (2006.01)

(52) U.S. Cl.
CPC ............ *F01K 23/101* (2013.01); *F23L 7/007* (2013.01); *F23N 3/002* (2013.01); *F25J 3/0483* (2013.01); *F25J 3/04496* (2013.01); *F25J 3/04515* (2013.01); *F25J 3/04533* (2013.01); *F25J 3/04957* (2013.01); *F23N 2037/28* (2013.01); *F25J 2230/40* (2013.01); *F25J 2260/80* (2013.01); *Y02E 20/18* (2013.01); *Y02E 20/326* (2013.01); *Y02E 20/344* (2013.01)

(58) Field of Classification Search
CPC .... F25J 3/04496; F25J 3/04515; F25J 3/0483; F25J 3/04957; F25J 3/04533; Y02E 20/326; Y02E 20/344; Y02E 20/18
USPC .............................................. 290/7; 700/286
See application file for complete search history.

(56) References Cited

U.S. PATENT DOCUMENTS

| | | | | |
|---|---|---|---|---|
| 6,345,517 | B1* | 2/2002 | Jahnke | F01K 23/068 62/643 |
| 7,191,587 | B2* | 3/2007 | Marin | F01K 21/047 60/39.17 |
| 2002/0017113 | A1* | 2/2002 | Seiver | F25J 3/04412 62/656 |
| 2005/0235650 | A1* | 10/2005 | Griffin | F01K 23/10 60/780 |
| 2007/0251267 | A1* | 11/2007 | Ha | F25J 3/0406 62/615 |
| 2007/0255459 | A1* | 11/2007 | Althaus | F02C 6/16 700/290 |
| 2008/0087022 | A1* | 4/2008 | Briesch | F01K 23/068 60/772 |
| 2010/0175426 | A1 | 7/2010 | Wallace | |
| 2011/0290163 | A1* | 12/2011 | Kobayashi | F23B 90/06 110/345 |
| 2012/0055331 | A1* | 3/2012 | Steele | C01B 3/36 95/8 |

FOREIGN PATENT DOCUMENTS

| | | |
|---|---|---|
| WO | 99/40304 A1 | 8/1999 |
| WO | 2009/075897 A2 | 6/2009 |
| WO | 2009/087060 A2 | 7/2009 |
| WO | 2009/087210 A2 | 7/2009 |

OTHER PUBLICATIONS

Tranier et al. "Air Separation, flue gas compression and purification units for oxy-coal combustion systems." Energy Procedia, ScienceDirect: (2010) pp. 1-6.

Chalmers et al. "Valuing flexible operation of power plants with CO2 capture." Energy Procedia, ScienceDirect: (2009) pp. 4289-4296.

Chalmers et al. "Initial Assessment of Flexibility of Pulverised Coal-Fired Power Plants with CO2 Capture." Imperial College London, 3rd International Conference on Clean Coal Technologies for our Future: May 16, 2007.

Chalmers et al. "Initial evaluation of the impact of post-combustion capture of carbon dioxide on supercritical pulverised coal power plant part load performance." Fuel, ScienceDirect, Energy Technology for Sustainable Development Group, Mechanical Engineering Department, Imperial College: Feb. 27, 2007: pp. 2109-2123.

Rodney J. Allam: "Improved oxygen production technologies"; Energy Procedia vol. 1, No. 1; Feb. 1, 2009; pp. 461-470.

International Search Report dated Mar. 7, 2014 issued in corresponding PCT Application No. PCT/GB2011/052102.

International Preliminary Report on Patentability dated Mar. 25, 2014 issued in corresponding PCT Application No. PCT/GB2011/052102.

* cited by examiner

CONTROL SYSTEM AND METHOD FOR POWER PLANT

CROSS REFERENCE TO RELATED APPLICATIONS

This application which is a § 371 National Stage Application of International Application No. PCT/GB2011/052102, filed Oct. 28, 2011, which claims priority to Great Britain Application No. 1018227.7, filed Oct. 28, 2010, the disclosures of which are incorporated herein by reference.

The invention relates to a control system for and a method of operation of a thermal power plant having either an oxyfuel firing capability or a partial oxyfuel firing capability which may for example be combined with post-combustion carbon capture (PCC) technology. The invention in particular relates to a control system for and a method of operation of a thermal power plant suitable for flexible operation in response to varying demand from the grid in particular over short timescales. The method is in particular a method to produce an improved primary and secondary response to changes in grid demand.

Most of the energy used in the world today is derived from the combustion of fossil fuels, such as coal, oil, and natural gas, for example in thermal power generation plants. The combustion of such fossil fuels produces a large volume of $CO_2$ which was conventionally vented to atmosphere. Atmospheric $CO_2$ is recognised as a significant greenhouse gas. It has been established that one of the main causes of global warming is the rise in greenhouse gas contamination in the atmosphere due to anthropological effects. The limitation of further release of greenhouse gases and into the atmosphere is generally recognised as a pressing environmental need. The successful implementation of strategies to reduce atmospheric $CO_2$ emissions from the combustion of fossil fuels is important if the continued use of fossil fuels in many applications, including power generation, is to be possible.

Post-combustion carbon capture (PCC) is a means of mitigating the effects of fossil fuel combustion emissions by capturing $CO_2$ from large sources of emission such as thermal power plants which use fossil fuel combustion as the power source. The $CO_2$ is not vented to atmosphere but is removed from flue gases by a suitable apparatus and as a rich $CO_2$ gas compressed and stored away from the atmosphere. A thermal power plant adapted for post-combustion carbon capture is provided with a suitable apparatus downstream of the power generation system and adapted to receive flue gases from the combustion of the fuel and remove the $CO_2$ from it for sequestration.

Oxyfuel firing is a means of firing the fuel with an oxygen enriched comburant gas. In conventional fossil fuel fired combustion equipment for example in boilers for steam generation the oxygen required to burn the fuel is supplied by using atmospheric air as a comburant gas. In the case of oxyfuel firing a supply of gas with a higher oxygen content, and in particular a mixture of substantially pure O2 and recycled CO2, is used as a comburant gas. The oxyfuel combustion process seeks to produce combustion products that are highly concentrated in CO2 and in particular consist essentially of CO2 and water to facilitate carbon capture and mitigate the CO2 emissions. To effect this, the combustion air supply must first be & separated prior to supply to the furnace in a suitable air separation unit (ASU). Only the separated gaseous oxygen is intended for supply to the combustion process. The separated nitrogen/argon mix may be vented to atmosphere. Within the air separation unit processes the liquid oxygen may be cryogenically stored in the embedded liquid oxygen (LOX) storage facility. Liquid air may be stored in the embedded liquid air (LA) storage facility.

In the case of a plant having a partial oxyfuel firing capability combined with PCC technology, the reduction of $CO_2$ levels is split between the two systems. In such plants it is expected that the ASU unit capacity will therefore be smaller resulting in partially enriched $CO_2$ being present in the flue gas at a level which cannot be directly compressed in $CO_2$ compression systems. $CO_2$ concentration must therefore be increased by utilization of PCC technology. Since the $CO_2$ concentration in the flue gas is higher than in the convention air firing mode, the size of the PCC process will also be reduced from that of a PCC system attached to a plant without oxyfuel capability.

Fossil fuel thermal power plants have a particular role in a practical mixed supply grid. Typically they are not run continuously at full load. Instead, their output will vary, partly in response to changes in supply or demand within the grid so that the grid supply is maintained. The operation of such plant requires a consideration not merely of full load performance but also of part load performance and of the ability of plant to startup, shutdown, ramp output rapidly in response to changing grid demand and to accurately meet smaller, frequent load changes associated with operation in frequency regulating mode. A capability to provide a standard primary response to grid demand is a required feature for such plant.

In a conventional plant, the net output of the plant can be modified by varying the gross power output of the plant. This is accomplished by varying the fuel firing level and, in certain circumstances, by a reduction in the amount of steam used to pre-heat boiler feedwater. Whilst it is possible to meet current grid code response requirements, the rate at which the gross power of a conventional plant can be varied is limited by various inertial factors, the desire to avoid thermal stresses and the need to satisfy steam pressure constraints during transients. Whilst it is possible to improve the ability to respond to sudden increases in load demand by operating the plant with partial closure of the turbine governor valve, or to rapid reduction in load demand by use of steam turbine by-pass facilities, these conventional approaches have the disadvantage of reducing cycle efficiency and therefore creating additional operating costs. Where rapid changes in firing level are used in an attempt to meet response requirements, these actions often result in operation of the plant beyond its original design point for both material and process limiting conditions, significantly reducing the lifetime of the plant and creating additional lifetime costs in terms of both maintenance and the need for more frequent repairs. Such plants have increased downtime, risk and costs to provide required standard flexibility to the grid.

It is expected that energy supplied to the grid from renewable sources particularly wind and solar is set to increase. Although offering many environmental advantages, renewable energy is characterised by its sudden changes in supply levels due to local changes in wind strength, variation in cloud sun etc. As the world switches over to the use of a greater proportion of renewable energy sources, these sudden changes will increase in magnitude causing bigger frequency and voltage excursions on the grid. In turn, this situation will force grid operators to significantly increase the flexibility requirements for non-renewable plant, especially with respect to primary response.

A capability to provide a rapid primary response to changes in grid demand will therefore be necessary to ensure grid stability and if provided in an efficient manner, will therefore become a highly desirable commercial feature for plant in the near future.

It has been suggested that the liquid oxygen storage facility provided in conjunction with the air separation unit may be used as a source of energy storage for demand flexibility. A consideration of this possibility may be found in the paper "Air separation, flue gas compression and purification units for oxy-coal combustion systems", Tranier et al, presented at the 10th International Conference on Greenhouse Gas control Technologies 19-23 Sep. 2010. The underlying principle proposed is to store liquid oxygen during periods of low grid demand such as off-peak hours or times when power from other sources such as wind is available in great quantities, for example by running the ASU at full or over capacity; and to unstore liquid oxygen at times of high demand. As a result, it is possible to produce extra power at peak demand times by reducing the power demand of the ASU. However, although the paper outlines this in principle, consideration is only given to application under steady-state load conditions at different steady-state load levels. The paper does not consider how it might be applied in a fully integrated manner, in particular when operating in non-steady-state load conditions in a manner which enables the plant to exhibit specific and improved short term responses to transient changes in grid demand.

Publication WO99/40304 also considers ASU load in relation to changes in grid demand. The plant is an integrated gasifier combined cycle plant. The operation methodology described in WO99/40304 is related to long term such a night/day or seasonal changes in the grid demand and this is achieved primarily by varying the generated output of the integrated gasifier combined cycle plant by means of changes in firing whilst maintaining the output of the air separation unit load, and therefore works power consumption at a constant level. In particular this methodology does not enhance the primary response capability of the steam generating part of the plant since this will be limited by the response of the fuel supply, combustion and thermal systems in a manner similar to that of all other conventional steam generating power plant.

Further optimisation of the overall cycle efficiency is suggested by varying the ASU load in a manner which follows the load demand to the integrated gasifier combined cycle plant. WO99/40304 does not consider short term changes in grid demand such as primary response changes.

In particular such methodology would reduce the primary response capability of the plant reducing the ability to maintain system frequency.

With such methodology an increase in demanded nett power output from the combined cycle plant would lead to an initial reduction of nett generated output due to the increase in works power drawn by the air supply unit necessary to match air supply with firing rate. Equivalent effects are associated with a reduction in demanded nett power output, again indicating that such methodology would worsen primary response. In particular this form of response would reduce the grid stability margin rather than improving it.

The methodologies described in WO99/40304 therefore provide either no enhancement of primary response or lead to a reduction of primary response capability of the unit. They are focused only on improvement of the combined steady state process efficiency.

Accordingly, a need exists in the art for an improved power plant system that offers one, some or all of the following:
Increasing the flexibility and ability to provide rapid primary response at low cost,
Reducing material stresses by eliminating the need for large, fast changes in firing.
Reducing costs associated with operation of the plant outside its design limits,
Reducing the downtime of a plant.

In accordance with the invention in a first aspect, a method of operation of a thermal power plant having an air separation system with a plurality of ASU compressors and a LOX/LA storage facility for oxyfuel firing of fuel, the method characterized by the step of controlling the net power output of the plant in response to a varying grid demanded net plant output by dynamically adjusting the works power of the ASU compressors. Importantly this method does not impact $CO_2$ capture rate, which at all times may be maintained at target level.

In particular the method is not a static control method and does not merely provide for separate control parameters at different steady-state load levels. The method rather provides for dynamic adjustment of the works power of the ASU compressors in response to short term changes in the net power output demand from the grid in an accurate and dynamically responsive manner. Integration of the dynamic control method for the component parts of the system including the ASU, Steam Generating plant and $CO_2$ compressors in real time enables the operation of the overall system to be optimised for both commercial and technical considerations during such transient changes in the grid output demand, and not merely at different steady-state load levels.

The dynamic adjustment of the works power of the ASU compressors provides part of the control of the net power output of the plant. The method recognises that other systems may also be used to contribute as appropriate given control factors, such as in particular the timescale over which dynamic adjustment is required. For example the step of controlling the net power output of the plant in response to a varying grid demanded net plant output may be performed by dynamically adjusting the works power of the ASU compressors in conjunction with co-ordinated changes in firing demand, and may also take into account the effects of works power draw from the $CO_2$ compressors and control strategies and limitations imposed by such compressors.

The step of controlling the net power output of the plant by dynamically adjusting the works power of the ASU compressors is performed dynamically in response to short term variations in grid demanded net plant output. Dynamic adjustment of the works power of the ASU compressors gives a capability to respond to transient changes in the grid output demand for example occurring over timescales of less than 30 minutes, and for example less than 10 minutes, and optionally down to periods of between 10 and 30 seconds. The invention is not limited to making use of the ASU compressors to respond to such very short term variations in grid demanded net plant output, but finds particular advantage where accurate response of nett generated power is required over any timescale.

Short term changes in the net power output demand from the grid can be conventionally classified into changes of the type requiring a "primary response", which are relatively smaller increases or decreases in load demand taking place over seconds to minutes, and changes of the type requiring a "secondary response", which are typically relatively larger increases or decreases in load demand taking place over minutes or more, extending according to some definitions to long term diurnal/seasonal increases or decreases in load demand. Primary response may be accommodated operationally at least in part by frequency regulation. Secondary response may be accommodated operationally by increasing the operational load on the plant. Such considerations will be familiar to those skilled in the art.

For example, the "primary response" of the plant may be defined conventionally in the art as the response to very short term changes in the net power output demand from the grid taking place over seconds to minutes, for example over periods of less than 10 minutes, and for example over periods of between 10 and 30 seconds. The "secondary response" of the plant may be defined conventionally in the art as the response to longer term changes in the net power output demand from the grid taking place over a longer period, for example of minutes or more.

Meeting the primary response requirement needs a capability for dynamic increases or decreases in net power output over seconds to minutes that tracks as closely as possible such relatively smaller increases or decreases in load demand taking place over seconds to minutes.

In a preferred case, the method of the invention is characterized by the step of controlling the net power output of the plant in response to a varying grid demanded net plant output by dynamically adjusting the works power of the ASU compressors being performed at least to provide a primary response to primary changes in the net power output demand, where primary response will be understood by the skilled person and is defined hereinabove.

This is particularly advantageous as it matches systems with a capacity for fast load changes (ASU compressors) to a similarly rapid transient change in output demand to give an effective primary response. This can be contrasted with prior art systems which merely address long term changes in output demand and merely consider the works power of the ASU as a means to optimise efficiency over a long term cycle. For example in Tranier et al noted above consideration is given only to steady-state load conditions at different steady-state load levels and no consideration is made of short term responses to transient changes in grid demand. For example the method of WO99/40304 is not able to provide a short term response to the grid because the fast load changing systems (ASU) are kept at constant load or are set to follow the power plant system, and the power plant systems are only able to provide standard primary response and are unable to change the load as rapidly as the rapid primary response.

The method of the invention provides for dynamic adjustment of the works power of the ASU compressors to respond to short term changes in the net power output demand from the grid dynamically and responsively for example in real time and thus produces a much improved short term response, and in particular a much improved primary response.

Preferably the step of dynamically adjusting the works power of the ASU compressors is the step which provides the predominant source of the overall primary response of the plant and may for example be essentially the sole source of the primary response of the plant.

Advantageously, the step of dynamically adjusting the works power of the ASU compressors to provide at least a predominant source of the primary response of the plant may allow in the preferred case that the power plant load is kept constant during the primary response.

Thus, in primary response mode, the air separation plant load is varied rapidly and is used to provide primary response frequency regulation to the grid while the power plant process is preferably kept at constant load.

Preferably, the step of controlling the net power output of the plant in response to a varying grid demanded net plant output by dynamically adjusting the works power of the ASU compressors is performed additionally to provide at least part of a secondary response to secondary changes in the net power output demand, where secondary response will be understood by the skilled person and is defined hereinabove. Preferably, the secondary response is achieved by the step of controlling the net power output of the plant in response to a varying grid demanded net plant output by dynamically adjusting the works power of the ASU compressors in conjunction with co-ordinated changes in firing demand.

The secondary response is thus preferably achieved by providing a coordinated primary response to the grid from the ASU systems in the manner above described together with smooth load change in firing systems of the power plant process. The ASU system load is not determined and fixed by the oxidant demand of power plant process at any point in time, instead it is determined primarily to provide the primary and secondary response to the grid, and secondarily to provide the total sum of the required oxidant over the cycle period of time.

Preferably in particular the step of controlling the net power output of the plant comprises dynamically adjusting the works power of the ASU system compressors to meet the grid output demand requirement in conjunction to optimization of the rest of the power plant equipment (optionally where applicable including CO2 compression system compressors) to reduce works power and move more closely towards target cycle efficiency over a cycle period. In particular the method comprises dynamically adjusting the works power of each ASU system compressor, in such manner as to tend to minimize the sum total of the works power. Adjustments are made across all ASU compressors. That is, the method comprises dynamically setting a design works power for each compressor in response to a transient change in grid load demand which is then modified by the difference between the power demanded by the grid and that supplied by the power generation unit to give the setpoint value for control of ASU compressor power. At all times of changing the compressors works power the ASU system is able to supply oxygen to the plant for oxyfuel combustion at demanded level. This is achieved by utilisation of LOX/LA storage when the ASU system separation process can not meet demand or is producing more oxygen than required by the power plant.

The method thus comprises using at least the power consumption of the compressors of the air separation system as a control parameter for the net power output of the plant and comprises the step of making a dynamic adjustment of the same in response to changing net power output demand from the grid.

More specifically, the method additionally comprises using the LOX/LA storage level/storage pressure as a control parameter for the net power output of the plant and comprises the step of making a dynamic adjustment of the same in response to changing net power output demand from the grid. Again, the key to the method in this embodiment is a capability to make dynamic adjustment of the LOX/LA storage level/storage pressure to respond to short term changes in the load requirement, in particular to provide an improved primary response capability, rather than merely to different steady-state load levels.

More specifically, the step of adjusting the works power of one or more ASU compressors in response to a change in grid demanded plant output comprises either: tending to reduce the works power of the ASU compressor in response to an increased grid demand and balancing the same by unstoring liquid oxygen and/or liquid air from the LOX/LA storage to make up the required supply for oxyfuel firing; or tending to increase the works power of the ASU compressor in response to a reduced grid demand and balancing the same by supplying the resultant excess liquid oxygen and/or liquid air to the LOX/LA storage.

Thus, the ASU compressor system is operated at reduced power at times of higher grid demanded output, and this reduced power reduces the overall works power of the plant in order to supply additional power to the grid without the need to vary the power output of the generation plant.

In a preferred embodiment of the method the power generation plant is operated close to or at its design output in normal demand conditions and in particular is not operated at part load with capacity reserve such as might be provided for example by means of an output restrictor such as a turbine governor. Instead the power consumption of the ASU compressor system provides a capacity reserve to supply additional power to the grid at times of higher grid demanded output. The generation plant may be operated at or near design load over a greater range of grid demand conditions to achieve target generation plant efficiency. The thermal load of the generation plant may be kept constant and variations in the net power output to the grid may be achieved by varying the power consumption of the ASU compressors in particular in conjunction with selective over-storage or unstorage of oxygen to or from the oxygen storage system.

By coordinating the control of the ASU compressor system and LOX/LA supply system with the control of firing and works power for the main power plant in an integrated manner a significant improvement in unit flexibility and primary and secondary grid demand response may be achieved for the power plant unit when operating in oxyfuel mode or part oxyfuel mode with PCC.

The method is more flexible and controllable than one that merely shuts down one or more compressors. Merely stopping one or more compressors suffers from the problem that additional power is only available in fairly large increments, which may or may not be appropriate in all situations. The invention does not preclude compressor shut down when changes in power demand are of a scale to make that an efficient control alternative. For smaller changes and where the available power changes do not exactly match the change in grid demand a system of dynamic adjustment of ASU compressor power level is much to be preferred. Additionally this method does not reduce the amount of $CO_2$ captured during its operation, and therefore does not impact upon the capture rates. In oxyfuel mode the CO2 compressors are compressing complete flue gas rich in $CO_2$ at the design rate as produced in the boiler. In part oxyfuel mode, the PCC and $CO_2$ compression units are stripping and compressing accordingly at the target rates at all times following boiler requirements. Therefore this invention is significantly valuable for utility as it achieves important flexibility improvements without reducing the $CO_2$ capture rates.

In particular the control system is uniquely able to offer some or all of the following commercial and operational advantages:

More reliably achieve target $CO_2$ capture rates and keep them constant.

More flexible primary and secondary response to changes in grid power demand even when operating with a fully open turbine governor valve.

Improved ability to accurately follow grid requirements for both small and large changes in demand.

The ability to accurately pass the load ramp gates at the start and end of load changing ramps made to grid instructions Improved cycle efficiency by eliminating the need to operate with a partially closed turbine governor valve in frequency regulating mode.

The ability to operate more closely to target cycle efficiency in periods when operation at maximum output power and/or the provision of a frequency regulating capacity attracts premium payments.

Improved plant life and reduction in maintenance costs by eliminating the need to make large, rapid changes in firing rate.

Reduced risks for plant operation and integrity by eliminating the need to make large, rapid changes in firing rate.

The ability to significantly improve commercial benefit for the power plant unit by enabling optimisation of the overall operation of the power plant unit by management and operational staff on a day to day basis.

The ability to optimise ASU compressor usage to prolong life expectancy.

These advantages are achieved by the use a co-ordinated regulatory control system for the ASU oxygen supply plant and the Main Power Generation Plant systems. The invention allows the integration and control of fuel firing strategies and control of overall works power for the power plant unit.

The method is a method of operation of a thermal power plant having a capability for oxyfuel firing of fuel. The method is not particular to the type of fuel used. The method is a method of operation of a thermal power plant having a capability for oxyfuel firing of a combustible fuel including combustion of carbonaceous fuel for example including carbonaceous fossil fuel, for example including coal, and for example pulverous coal, but also for example including gas, and for example including oil, and for example including biomass, and for example including distillate, and any combination of same.

Preferably, the method is not a gasification method. Preferably, the method is a combustion method in which the said combustible fuel is burned to generate the thermal energy for plant operation. For example, the method is a combustion method in which pulverous coal is burned to generate the thermal energy for plant operation.

In accordance with the invention in a further aspect, a thermal power plant comprises a power generation unit having an oxyfuel firing system including an air separation system with a plurality of ASU compressors and a LOX/LA storage facility, and is characterized by provision of a control system adapted to control the net power output of the plant in response to a varying grid demanded net plant output by dynamically adjusting the works power of the ASU compressors, for example in accordance with the foregoing principles of the method of the first aspect of the invention.

Preferably the control system is adapted to dynamically adjust the works power of each ASU compressor in such manner as to tend to minimize the sum total of the works power adjustment made across all ASU compressors.

Preferably the control system is adapted to adjust the works power of the ASU compressors in conjunction with a control of the supply of LOX/LA to/from the LOX/LA storage facility, in particular either: tending to reduce the works power of the ASU compressors in response to an increased grid demand and balancing the same by unstoring LOX/LA from the LOX/LA storage to make up the required supply for oxyfuel firing; or tending to increase the works power of the ASU compressors in response to a reduced grid demand and balancing the same by supplying the resultant excess LOX/LA to the LOX/LA storage.

The ASU compressor system is thus operated at reduced power at times of higher grid demanded output, and this reduced power reduces the overall works power of the plant in order to supply additional power to the grid without the need to vary the power output of the generation plant. It is operated at increased power to restore oxygen at times of lower demand. Preferably therefore, the compressor system might have a capacity which is bigger than required for steady state operation of the power plant in order to have additional capacity to generate excess oxygen for storage at times of lower demand.

Other preferred features of the thermal power plant of the second aspect of the invention will be understood by analogy to the method of the first aspect of the invention.

The principles of operation of the invention will be described in greater detail by way of exemplification with reference to FIGS. 1 and 2 of the accompanying drawings in which.

Figure 1:
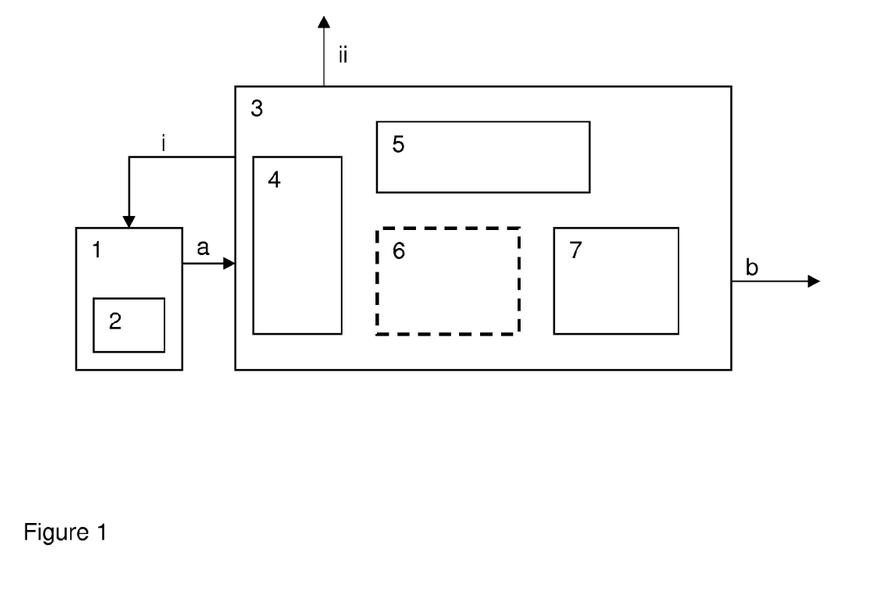
FIG. 1 is a schematic flow chart of the process.

An outline schematic of the process is shown in FIG. 1 which shows an oxyfuel process, and an optional PCC stage for a part oxyfuel with PCC process.

| Reference numerals in FIG. 1 are as follows. | |
| --- | --- |
| 1 - ASU unit | a - oxygen supply |
| 2 - LOX/LA storage | b - liquid $CO_2$ to transportation |
| 3 - Power plant | i - electrical power to power the ASU compressors |
| 4 - Boiler unit | |
| 5 - Turbine unit | ii - electrical energy sent out to the grid |
| 6 - optional PCC process | |
| 7 - $CO_2$ compression system | |

At any instant in time the Sent Out Power from the Power Plant Unit $W_{so}(t)$ is the difference between the power generated by the main plant $W_{gen}(t)$, which is a complex function of steam pressure and plant dynamics, and the total Works Power $\Sigma WP(t)$ used by the unit to generate the steam:

$$W_{so}(t) = W_{gen}(t) - \Sigma WP(t) \quad (1)$$

In the case of an oxyfuel plant, the ASU compressors form part of the overall works power used by the Power Plant. Proposals for dealing with rapid load increases by stopping one or more ASU compressors suffer from the problem that the additional power is only available in fairly large increments, which may or may not be appropriate in all situations. For smaller changes and where the available power changes does not exactly match the change in Grid demand these solutions produce significant disturbances to operating conditions in the main Power Plant which persist for some period of time after the event.

The proposed design avoids these problems and is able to accurately follow both large and small changes for both increases and decreases in transient demand changes without attendant disturbances to the main Power Plant operating conditions.

Primary Response Algorithm

This algorithm provides the main, short term response for both large and small changes in Grid demand.

Each compressor is controlled to a 'design' power level $W_i^{des}$ necessary to provide the correct flow of Oxygen required by the Main Power plant at each point in time. The 'design' level is determined by the integrated control system and depends on the ASU compressor characteristics, the required flow and storage tank level together with plant operational and commercial objectives entered into the optimisation algorithm by plant operatives or management. The 'design' power level for each compressor is then modified by the difference between the power demanded by the Grid and that supplied by the Power Plant unit to give the setpoint value for the ASU compressor power controller.

$$W_{setpoint}(t) = W_i^{des} + \Delta WP_i(t) \quad (2)$$

where the total change in ASU compressor works power required to balance the Grid demand is $$\sum_{i=1,N} \Delta WP_i(t) = (W_{so}(t) - W_{dem}(t)) \quad (3)$$

The power correction for each ASU compressor $\Delta WP_i(t)$ is optimised taking account of factors including the cost of power, compressor efficiency and turn-down, storage levels for LOX and LA, likely further changes in demand and consideration of mechanical factors including life usage.

For small changes in Grid demand the modulation of power to one or more ASU compressors may be the optimum solution whilst for larger changes it may be more desirable to start or stop one or more ASU compressors. This range of possible scenarios may be handled by a comprehensive optimisation algorithm which takes account of the relevant operational factors and plant constraints. The 'rules' for this algorithm may be set and modified by plant management or operators.

Where the change in Grid demand falls within the range for which equation 3 is applicable, the main unit firing controls will make only a relatively slow adjustment to the firing controls setpoint based on Grid demand $W_{dem}(t)$. Changes to the firing controls will be done in such a manner as to tend to minimize power plant works power, maximizing the cycle efficiency and reducing thermal stress on plant.

In cases where this range is exceeded, larger and more rapid changes in firing control system parameters will automatically occur in addition to maximum permissible action being taken on ASU compressor power control.

Secondary Response Algorithm

Unit Secondary Response is met by the Primary Response algorithm used in conjunction with coordinated changes in firing demand.

The principal objectives of Secondary Response control function are to:

i) Reduce and in the ideal case minimise the total ASU compressor power correction factor $$\sum_{i=1,N} \Delta WP_i(t)$$

in the long term. This is achieved by modification of firing demand in a co-ordinated manner taking into account a Cost or Objective function which itself is dependent on management objectives and plant factors relevant at the time including the need to maintain an adequate reserve of liquefied Oxygen.

ii) Maintain the storage levels of both LOX and LA within acceptable operating limits and/or according to operator manual setpoint. This is achieved by co-ordinated modification of the ASU compressor Works Power demand signals in conjunction with appropriate changes in firing level.

Figure 2:
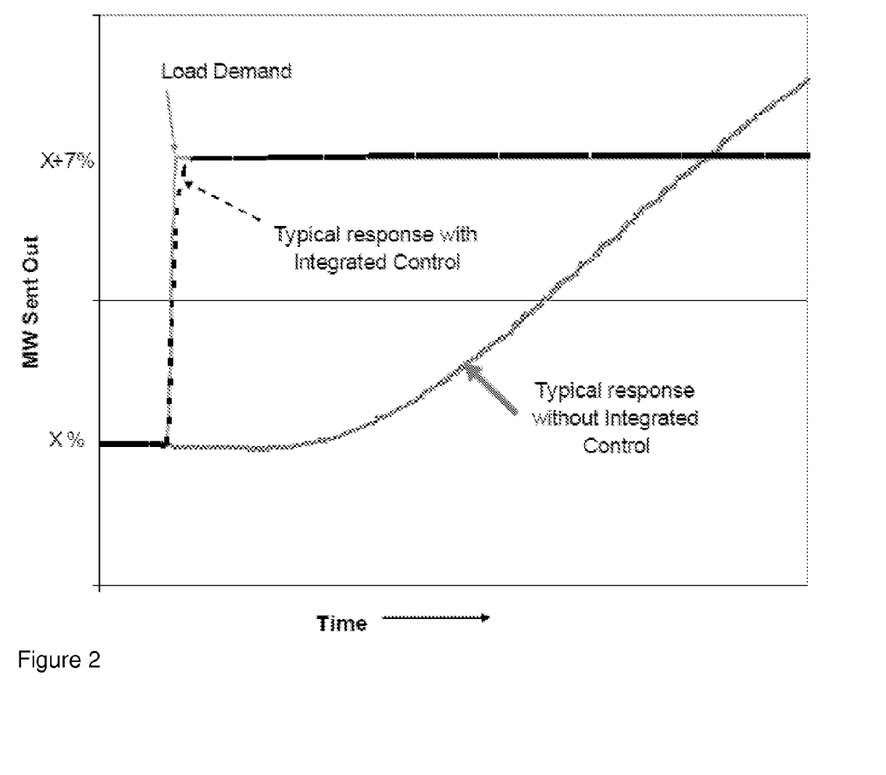
FIG. 2 illustrates the improved dynamic response that may be achieved thereby.

Results from a detailed non-linear simulation of an Oxyfuel plant indicate that the expected open governor response of an oxyfuel power plant to a +7% change in load demand would be as shown in FIG. 2. FIG. 2 shows the open governor response of an oxyfuel plant embodying the principles of the invention to +7% step change in grid demand. MW sent out is plotted against time and graphical representations are shown of the change in load demand, the typical response of a conventional system without integrated control in accordance with the principles of the invention, and a suggested typical response with such integrated control in accordance with the principles of the invention. It can be seen that the invention offers a capability to match the primary response much more closely to the step change in grid demand.

In a further preferred case the plant has a part oxyfuel and post-combustion carbon capture (PCC) facility. The method is applicable to this cycle in same fashion as in a pure oxyfuel plant.

The invention claimed is:

1. A method of operation of a thermal power plant having an air separation system with a plurality of air storage unit (ASU) compressors and a liquid oxygen/liquid air (LOX/LA) storage facility for oxyfuel firing of fuel, the method comprising:
    controlling a net power output of the thermal power plant in response to a varying grid demanded net plant output by dynamically adjusting a works power of the ASU compressors,
    wherein the dynamically adjusting the works power is performed by:
    setting a design works power level $W_i^{des}$ for the works power of each compressor of the ASU compressors;
    modifying, for each compressor of the ASU compressors, the design works power level to a setpoint value for a compressor power controller according to a relationship:

$$W_{setpoint_i}(t) = W_i^{des} + \Delta WP_i(t)$$

where $\Delta WP_i(t)$ is a change in the works power for each compressor of the ASU compressors, and (t) is a time value;
    adjusting a power correction for each compressor of the ASU compressors $\Delta WP_i(t)$ to reduce the total change in works power for each compressor of the ASU compressors required to balance grid demand as determined by a relationship:

$$\sum_{i=1,N} \Delta WP_i(t) = (W_{so}(t) - W_{dem}(t)),$$

wherein $W_{dem(t)}$ is the grid demand and $W_{so(t)}$ is a sent out power from the thermal power plant, wherein the net power output of the thermal power plant is controlled by dynamically adjusting the works power for each compressor of the ASU compressors in response to short term variations in grid demanded net plant output occurring over timescales of less than 30 minutes so as to provide a predominant source of an overall primary response of the thermal power plant to primary changes in the net power output demand.

2. A method in accordance with claim 1 wherein the step of dynamically adjusting the works power for each compressor of the ASU compressors is performed to provide essentially a sole source of the primary response of the thermal power plant.

3. A method in accordance with claim 1 wherein the thermal power plant load is kept constant during the primary response.

4. A method in accordance with claim 1 wherein the step of controlling the net power output of the thermal power plant in response to a varying grid demanded net power plant output by dynamically adjusting the works power for each compressor of the ASU compressors is performed additionally to provide at least part of a secondary response to secondary changes in the net power output demand.

5. A method in accordance with claim 4 wherein a secondary response is achieved by a step of controlling the net power output of the thermal power plant in response to a varying grid demanded net plant output by dynamically adjusting the works power for each compressor of the ASU compressors in conjunction with coordinated changes in firing demand.

6. A method in accordance with claim 1 wherein the controlling the net power output of the thermal power plant is performed without changing a $CO_2$ capture rate.

7. A method in accordance with claim 1 wherein the controlling the net power output of the thermal power plant comprises dynamically adjusting the works power for each compressor of the ASU compressors to meet the grid requirement in conjunction to optimization of a rest of the thermal power plant equipment to reduce works power and move more closely towards target cycle efficiency.

8. A method in accordance with claim 7 wherein the controlling the net power output of the thermal power plant comprises dynamically adjusting the works power for each compressor of the ASU compressors to reduce the sum total of the works power adjustment made across all compressors.

9. A method in accordance with claim 1 wherein adjustments are made across all ASU compressors.

10. A method in accordance with claim 1 comprising the step of setting the design works power level for each compressor in response to a change in grid load demand which is then modified by the difference between the power demanded by the grid and that supplied by a power generation unit to give the setpoint value for control of ASU compressor power.

11. A method in accordance with claim 1 wherein at least the power consumption of compressors of the air separation system is used as a control parameter for the net power output of the thermal power plant and the method comprises a step of making a dynamic adjustment of the same in response to changing net power output demand from the grid.

12. A method in accordance with claim 11 wherein a liquid oxygen storage level/storage pressure is used as a control parameter for the net power output of the thermal power plant and the method comprises a step of making a dynamic adjustment of the same in response to changing net power output demand from the grid.

13. A method in accordance with claim 1 wherein the step of adjusting the works power of one or more compressors of the ASU compressors in response to a change in grid demanded plant output comprises either:
tending to reduce the works power for each compressor of the ASU compressors in response to an increased grid demand and balancing the same by unstoring liquid oxygen and/or liquid air from the LOX/LA storage to make up a required supply for oxyfuel firing; or
tending to increase the works power for each compressor of the ASU compressors in response to a reduced grid demand and balancing the same by supplying a resultant excess liquid oxygen and/or liquid air to a LOX/LA storage.

14. A method in accordance with claim 1 wherein the thermal power plant is operated close to or at its design output in normal demand conditions and is not operated at part load with capacity reserve by means of an output restrictor.

15. A method in accordance with claim 1 wherein the power correction for each compressor is adjusted taking account of factors selected from: cost of power, compressor efficiency and turn-down, storage levels for LOX and/or LA, expected further changes in demand and consideration of mechanical factors including life usage.

16. A thermal power plant comprising a power generation unit having an oxyfuel firing system including an air separation system with a plurality of air storage unit (ASU) compressors and a liquid oxygen/liquid air (LOX/LA) storage facility, comprising:
a control system adapted to control a net power output of the thermal power plant in response to a varying grid demanded net plant output by dynamically adjusting a works power of the ASU compressors,
wherein the control system dynamically adjusts the works power of the ASU compressors, the control system configured to:
set a design works power level $W_i^{des}$ for each compressor of the ASU compressors;
modify, for each of compressor of the ASU compressors, the design works power level to a setpoint value for a compressor power controller according to a relationship:

$$W_{setpoint_i}(t) = W_i^{des} + \Delta WP_i(t)$$

wherein $\Delta WP_i(t)$ is a change in the works power for each compressor of the ASU compressors, and (t) is a time value; and
adjust a power correction for each compressor $\Delta WP_i(t)$ to reduce the total change in works power for each compressor of the ASU compressors required to balance grid demand as determined by a relationship:

$$\sum_{i=1,N} \Delta WP_i(t) = (W_{so}(t) - W_{dem}(t)),$$

wherein $W_{dem(t)}$ is the grid demand and $W_{so(t)}$ is a sent out power from the thermal power plant,
wherein the net power output of the thermal power plant is controlled by dynamically adjusting the works power for each compressor of the ASU compressors in response to short term variations in grid demanded net plant output occurring over timescales of less than 30 minutes so as to provide a predominant source of an overall primary response of the thermal power plant to primary changes in the net power output demand.

17. A thermal power plant in accordance with claim 16 wherein the control system is adapted to dynamically adjust the works power for each compressor of the ASU compressors in such manner to reduce the sum total of the works power adjustment made across all ASU compressors.

18. A thermal power plant in accordance with claim 17 wherein the control system is adapted to adjust the works power for each compressor of the ASU compressors in conjunction with a control of the supply of LOX/LA to/from the liquid oxygen storage facility.

19. A thermal power plant in accordance with claim 18 wherein the control system is adapted:
to tend to reduce the works power for each compressor of the ASU compressors in response to an increased grid demand and balancing the same by unstoring LOX/LA from a LOX/LA storage to make up the required supply for oxyfuel firing; and/or
to tend to increase the works power for each compressor of the ASU compressors in response to a reduced grid demand and balancing the same by supplying a resultant excess LOX/LA to the LOX/LA storage.

20. A thermal power plant in accordance with claim 16 wherein the air separation system with the ASU compressors has a capacity which is bigger than required for steady state operation of the thermal power plant in order to have additional capacity to generate excess oxygen for storage at times of lower demand.

* * * * *